July 1, 1958 G. R. JONES 2,841,754
STEERING SYSTEMS FOR MARINE CRAFT
Filed Aug. 26, 1953
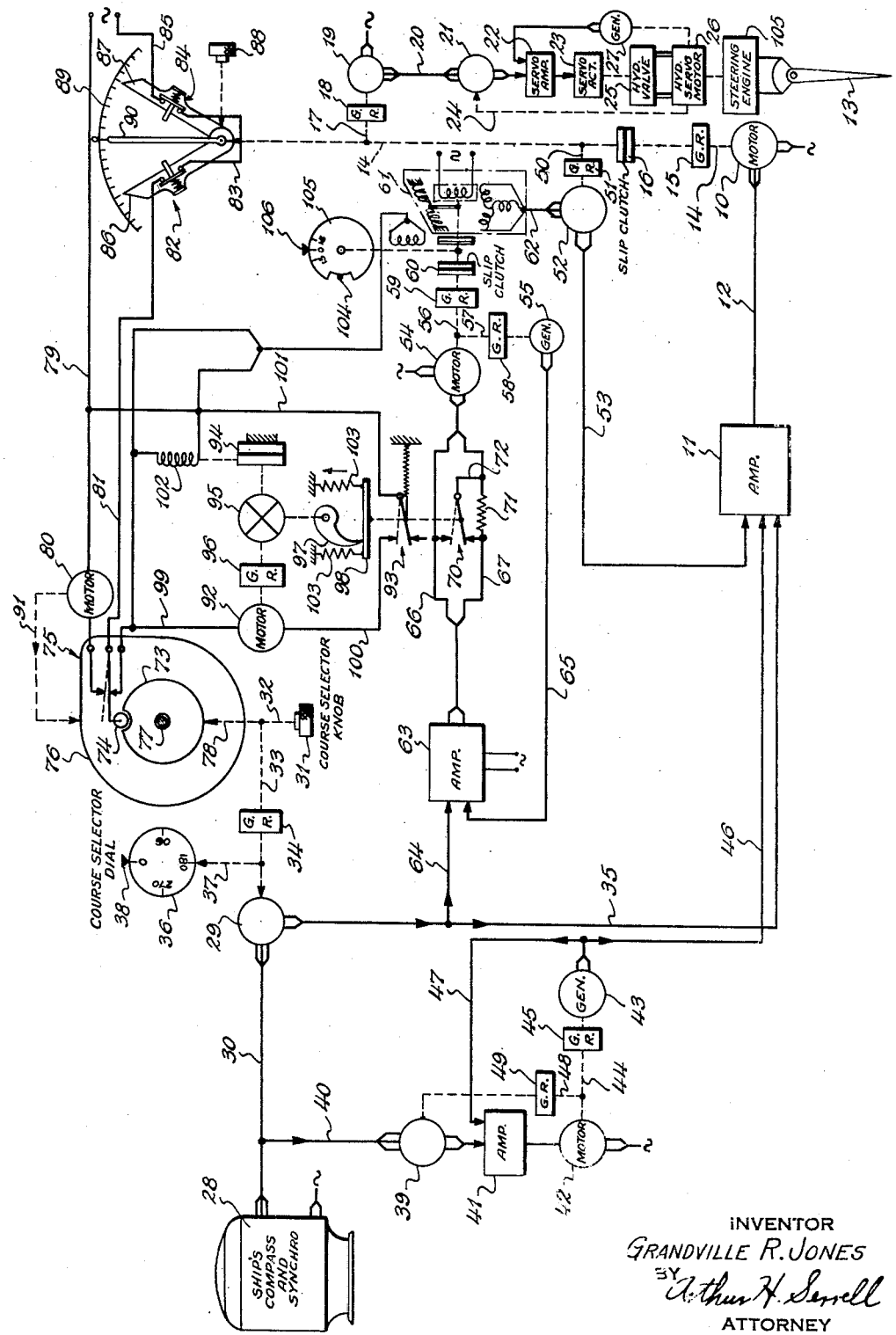
INVENTOR
GRANDVILLE R. JONES
BY Arthur H. Serrell
ATTORNEY United States Patent Office 2,841,754
Patented July 1, 1958

2,841,754

STEERING SYSTEMS FOR MARINE CRAFT

Grandville R. Jones, Stewart Manor, N. Y., assignor to Sperry Rand Corporation, a corporation of Delaware Application August 26, 1953, Serial No. 376,683

12 Claims. (Cl. 318—489)

This invention relates to a steering system for marine craft and particularly concerns the means for disabling the trim control instrumentalities of the system during course changes effective through resetting of a course selecting member. Steering operations effective through the rudder controlling servomotor of the system to maintain the craft on a selected heading depend on a number of factors. One of such factors is provided by a displacement signal obtained from a suitable reference device measuring deviations of the craft from the selected course. A second factor is a rate signal provided by an instrumentality responsive to the rate of change of the deviation of the craft from the selected course. A third factor is a signal corresponding to the time integral of the course displacement error of the craft. This factor provides trim control for the system, the same determining the amount of rudder to be carried by the craft to maintain course when persistent outside disturbing forces tend to move the craft off course. Such disturbing forces may result from damage to one of the craft's propellers, from drag on one side of the craft due to enemy action, or from other causes such as due to wind and/or sea. In such cases, the rudder is automatically set by the trim control to an angle that compensates the craft for the persistent error signal and the same maintains its selected course. The trim control factor of the system is not effective to operate the rudder during short period deviations of the craft from a selected course, the control in such instance being obtained from the first and second of the hereinbefore noted factors.

During command course changes of a marine craft having a long time constant, it is necessary to disable the rudder trim controls in order to prevent overoperation of the rudder. For particular craft, small course changes up to 15 degrees, for example, may require a time delay of approximately 60 seconds for completion and large course changes over 15 degrees may require approximately the same time delay for completion after the rudder angle of the craft goes below a predetermined limit. Operations of the improved trim control disabling means of the system are based on such timing data for a particular craft, the system automatically returning to normal operation when the new course is reached.

One of the features of the present invention resides in the provision of a disabling means for the trim control of the steering system that includes an element operatively connected to a settable course selecting member.

Another feature of the invention includes the provision of a re-establishing means for the trim control disabling means of the system whose timed operation is extended until the rudder angle of the craft goes below a predetermined limit.

Other features and structural details of the invention will become apparent from the following detailed description thereof in connection with the accompanying drawing showing a single schematic view and wiring diagram of a steering system in which the present inventive concepts are incorporated.

With reference to the drawing, the rudder controlling servomotor of the improved system is designated at 10. As shown, servomotor 10 is a conventional alternating current motor whose fixed field winding is excited from a suitable source of alternating current energy and whose control field winding is energized by the output of a suitable discriminating amplifier 11 by way of lead 12. The output of the controlling servomotor 10 is effective to steer the marine craft through its rudder 13. The control of the servomotor 10 over the rudder 139 is exercised in the present instance, by way of shafting 14 through gearing reduction 15 and slip clutch 16 to connected shafting 17, gear reduction 18 to a suitable electrical synchro or transmitter 19 of the selsyn type. The rotor winding of the transmitter 19 is energized from a suitable source of alternating current electrical energy and is positioned by the output of gearing reduction 18. The output of transmitter 19, as shown, is fed by way of lead 20 to an electrical repeater 21 of the selsyn type whose output fed by way of amplifier 22 is adapted to control a suitable servo actuator or electrical relay designated at 23. Shafting 24 indicates a mechanical repeatback link connecting the hydraulic servomotor 26 to the rotor of the repeater selsyn 21. The mechanical output of the electrical actuator or relay is effective to operate a suitable hydraulic control valve 25 for the hydraulic servomotor 26 whose output is directly connected to a steering engine 105 which operates the rudder 13. As shown, a repeatback signal is fed to the servo amplifier 22 of the system from a generator 27 driven in accordance with the operation of the hydraulic servomotor 26. Operations of the controlling servomotor 10 are effective through the described elements to produce corresponding operations of the steering element of the system or rudder 13.

One of the input factors of the steering system is provided by a reference signal means operatively connected to the servomotor 10 providing a measure of the displacement of the craft from the course set by a course selecting member. As represented in the drawing, such means includes a ship's gyroscopic compass and the azimuth synchro or transmitter thereof indicated at 28. The synchro may be a selsyn type transmitter such as transmitter 19 whose output is supplied to a selsyn type control transformer 29 by way of lead 30. The rotor of data transformer 29 is positioned by a course selecting member designated as a course selector knob 31 by way of suitable shafting 32, connected shafting 33 and gear reduction 34. The synchro and transformer form a data transmission system whose signal output from the wound rotor of the transformer 29 is supplied as an input to the servomotor 10 from amplifier 11. Lead 35 connects the transformer 29 and amplifier 11. Compass card 36 is positioned by the knob 31 through shafting 37 connected to shafting 33. The index for the card 36 is indicated at 38. Both the card and index form a course selector as represented in the drawing. By adjusting the knob 31, card 36 is set to determine the course or heading of the craft. The course of the craft represented by the selector as positioned in the drawing is North. The described arrangement provides an input to the amplifier 11 from the data transmission system whose magnitude is proportional to the angular displacement of the craft from the selected course and whose phase depends on the sense of such displacement.

Another input factor of the steering system may be provided by a signal proportional to the rate of change of deviation or displacement of the craft from its selected heading. The means illustrated in the drawing to obtain this factor includes a synchro control transformer 39 connected to lead 30 by way of lead 40, whose displacement error output fed by way of amplifier 41 is effective to drive a suitable alternating current servomotor 42. A permanent magnet generator 43 driven from servomotor 42 by way of shafting 44 and gear reduction 45 provides a direct current signal output that is fed to amplifier 11 by way of lead 46. An A. C. speed generator could, of course, be used. Lead 47 connects the generator 43 and amplifier 41. The servomotor 42 is also connected to drive the rotor of the transformer 39 by way of shafting 48 connected to shafting 44 through gear reduction 49. The generator 43 in this arrangement is driven by the servomotor 42 at a speed that is proportional to the turning rate of the ship.

The automatic trim control input for the system includes a signal means operatively connected to the controlling servomotor 10 providing a time integral measure of the displacement of the craft from its selected course. As shown in the drawing, such means is effective, in the instant case, by modification of the repeatback signal means for the controlling servomotor 10 of the steering system. The servomotor 10 repeatback per se includes shafting 50 connected to shafting 14, gear reduction 51 and an electrical signal generator synchro or control transformer 52 whose output is fed to the amplifier 11 by way of lead 53. In normal operations of the system with no demand course change and with a zero input from the trim control to be hereinafter described, the rudder is controlled by the servomotor 10 in accordance with the displacement error signal from transformer 29 minus the turn rate signal from generator 43 and the repeatback signal. As the ship responds to the rudder the course error is reduced and when the rate and repeatback signals exceed the displacement signal the operation of the rudder is reversed to check the swing of the ship. The ship then returns to the selected course from which it originally departed with the displacement error, turning rate and repeatback signal being restored to a null condition.

The trim control for the illustrated system includes an electric motor or servomotor 54 and a permanent magnet generator 55 which produces a signal output proportional to the speed of the motor. As shown, generator 55 is driven by the servomotor 54 by way of shafting 56, connected shafting 57 and gear reduction 58. The output shaft 56 of servomotor 54 is also connected through a large reduction gear 59 and clutch 60 to the rotor of a synchro or transmitter 61 which in the arrangement provided is a reference synchro that functions to modify the repeatback signal input to amplifier 11. As provided, synchro or selsyn device 61 constitutes a signal transmitter and the synchro 52 connected thereto by lead 62 is an electrical transmitter whose output includes the integration signal provided by the trim control of the system. Servomotor 54 is responsive to the output of an amplifier 63 whose input is the course error signal less the signal from the generator 55. As shown, lead 64 connects the amplifier 63 to lead 35 carrying the course or displacement error signal. Lead 65 connects generator 55 and amplifier 63. The connections between amplifier 63 and servomotor 54 include leads 66 and 67. As shown, a circuit for shunting the input to the servomotor 54 is provided by a two-pole switch 70, resistor 71 and lead 72. In the full line position of switch 70, the resistor 71 is bypassed. In the dotted line position of switch 70, the leads 66, 67 and resistor 71 are series connected and the connection between the amplifier 63 and motor 54 is shunted. The output of the synchro 61 or signal means of the trim control provides a time integral measure of the displacement of the craft from its selected course. The synchro or signal means 61 is controlled by the output of the ship's compass and synchro 28 or the craft reference signal means to which it is operatively connected.

The automatic trim control operates with a persistent disturbing force on the craft due to an output from amplifier 63 which causes servomotor 54 to be driven at a speed proportional to the displacement or course error signal obtained from lead 64. The rotor of synchro 61 is slowly rotated by the servomotor 54 from its electrical zero position which shifts the electrical zero of synchro 52 in a direction to reduce the repeatback signal of the system. The servomotor 10 is then effective to increase the repeatback signal to again cancel the displacement or course error signal thereto. In so doing, the synchro 19 of the system is moved to call for additional rudder. The increased rudder angle brings the ship around to the selected course. By the time the course error signal is zero and the repeatback signal is zero, the synchro 61 will have rotated from its electrical zero with the repeatback rudder synchronized therewith so that the rudder is maintained in a displaced position. The ship therefore maintains the selected course with the rudder displaced to compensate for the persistent disturbing moment.

In accordance with the present invention, the automatic trim control of the system is rendered ineffective during command course changes of the craft. This is necessary in order to prevent significant overshooting or lagging of the new heading during turns due to the trim control. The arrangement provided in this connection functions as a time delay device that is operable during course changes of the craft to render the time integral producing means or trim control of the system ineffective. The disabling means for the trim control signal is also referred to herein as a second time delay device and a relay, the same including switch 70 which in its dotted line position shunts the input to servomotor 54 through resistor 71.

The first of the noted time delay devices is also effective to re-establish the disabling means for the trim control signal. As shown, the first time delay device includes two relatively movable parts such as cam 73 and cam follower 74 which are normally positioned at a null condition. Follower 74 is situated at the end of a switch arm of a two-pole switch 75 whose spaced contacts are fixed to a rotatably mounted plate 76. One end of the movable switch arm is also fixed to the plate 76. With the follower 74 in the recessed portion of cam 73, the respective parts are positioned in the null condition. In this condition, the switch arm is engaged with the lower of the switch contacts as shown in full lines in the drawing. As represented in the drawing, the cam 73 and rotatable plate 76 are mounted for independent movement about a common axis such as indicated by shaft 77. The arrangement includes a connection between the course selecting member or knob and the cam 73 which is represented by shafting 78. It is understood that to effect course changes of the craft, resetting of the knob 31 is required. With such movement of knob 32 the cam 73 is relocated correspondingly. This causes the follower 74 to rise so that the switch arm of switch 75 assumes its dotted line position. Operation of the switch 75 renders the means for disabling the trim control effective. Simultaneously, the switch 75 starts the operation of a means for re-establishing the time delay device in its null condition. As shown, this means also includes a motor drive for the plate 76 that operates to move the plate 76 with the cam follower 74 thereon until the parts are re-established in their null condition. The circuit illustrated in this connection includes lead 79, motor 80, switch 75, lead 81, switch 82, lead 83, switch 84, and lead 85. Switches 82 and 84 are conventional normally closed electrical switches that are included as a component part of a means for providing a measure of the rudder angle of the ship the same functioning at a predetermined limit for the ship to extend the operation of the time delay device.

The rudder angle measuring means includes a pair of axially positionable arms 86, 87 adjusted by a knob 88 in relation to an angle defining scale 89. The switches 82 and 84 are respectively mounted on the angularly disposed arms 86 and 87. The actuating element for the measuring means and switches is a member 90 readable on scale 89 and driven by the output shaft 14 of the servomotor 10, the same assuming an operating position during turns that corresponds to the actual displacement of the rudder 13 from a null position. With relatively large command heading changes such as above 15 degrees as heretofore mentioned and corresponding rudder movements, the actuating member 90 is moved sufficiently when the rudder angle reaches a corresponding but adjustable limit for different ships to engage either switch 82 or 84 and open the circuit containing motor 80 so as to prevent operation thereof and thus extend the duration of the operation of the time delay. In turns of less than the described degree, neither switch 82 nor 84 is opened by the actuator 90, the motor 80 is energized immediately upon closure of the motor circuit by switch 75, the same continuing to function until the motor 80 restores the parts to their null condition. Shafting 91, as depicted by dash lines, represents the driving connection between the motor 80 and the plate 76.

The improved system also includes a second time delay device that is rendered effective by the first time delay device upon completion of its period of operation with the restoration of cam follower 74 and cam 73 at their null condition. The second time delay device operates to restore the disabling means for the trim control to its normally ineffective condition. The second time delay provides a constant operating period of sufficient duration to assure that the craft is on its new heading before the re-establishment of the trim control in the steering system. Switching means 70 heretofore described either above or in connection with the second time delay device provides the normally ineffective means for disabling the trim control.

The elements and circuitry forming the second time delay device include switch 75 that is re-established in its normally closed position upon completion of the operation of the described first time delay device, motor 92, switch 93, electromagnetic clutch 94, differential 95, gear reduction 96, cam 97 and cam follower 98. Lead 99 connects the switch 75 and motor 92. Lead 100 connects the motor 92 and one of the fixed contacts of switch 93. The switch arm of switch 93 is connected to lead 79 by way of lead 101. The winding 102 of clutch 94 is connected across leads 99 and 101. As represented in the drawings, the switches 93 and 70 are tandem connected toggle switches operated by the cam follower 98. With the parts in the full line position shown and with switch 75 engaging its lower contact, the winding of clutch 94 is energized, the clutch input to differential 95 then being effective to hold the reversible cam 97 and follower 98 against the action of springs 103 to condition the parts of the device so that switch 93 is open and switch 70 renders the disabling means ineffective. In operation of the system with a command course change, the arm of switch 75 is actuated to its dotted line position and the operations of the first time delay device start. Simultaneously, the circuit including winding 102 of electromagnetic clutch 94 is opened to disengage the clutch 94 and permit spring 103 to urge the follower 98 in an upward direction as viewed in the drawing. This causes operation of the tandem toggle switches 93 and 70 so the respective arms thereof assume the dotted line positions indicated in the drawing. The parts remain in this position until the completion of the operation of the first time delay device and re-establishment of switch 75 in its null condition. The circuit including motor 92 is then closed and the input to the differential 95 obtained through gear reduction 96 from motor 92 is slowly effective to operate cam 97, the winding 102 then being re-energized and the faces of clutch 94 engaged. After the desired time interval, the output of the differential 95 effective through cam 97 and cam follower 98 against the action of spring 103 causes the operation of the toggle switches 93 and 70 so that the respective arms thereof return to their normal full line positions.

The improved steering system includes a means for limiting the amount of trim permitted the rudder. This is accomplished in the present instance by limiting the output of servomotor 54 in its driving connection to synchro 61. As shown, the clutch 60 is a slip clutch which permits operation of the motor 54 beyond the limits without reflecting such operations in synchro 61. The limiting means shown are a fixed pin 104 and a notched dial plate 105 driven from a connection with the input shaft to synchro 61. Plate 105 may be read on an index 106 to indicate the trim position of the craft's rudder due to persistent disturbing moments.

In accordance with the present inventive concepts, with demand turns, the period of operation of the improved trim control is constant for less than approximately 15 degree turns. With setting of adjustable knob 88 for a craft of the character having the limits suggested in the present description, the period of operation of the trim control cut out is variable for demand turns of greater than approximately 15 degrees depending on the duration of the effectiveness of the rudder angle measuring means in opening either of the switches 82, 84. However, sufficient delay is provided to assure that the craft has attained its new course before the trim control signal is restored to the system.

Where it is found desirable to obviate any carry-over from the trim control transmitter 61 of the system after a course change has been completed, the system may further include a suitable arrangement for zeroing the transmitter during the course change operation. This may be accomplished by an additional electrically operated clutch in series with the slip clutch 60 and providing suitable centering springs on the rotor of transmitter 61. The clutch may be in a parallel circuit with the motor 92, and be energized when the switch 93 closes the circuit including motor 92. The clutch upon being energized is disengaged allowing the centering springs to act on the rotor of the transmitter 61 to zero its output.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a steering system for marine craft having a rudder controlling servomotor, a settable course selecting member, reference signal means operatively connected to said servomotor providing a measure of the displacement of the craft from the course set by said course selecting member, signal means operatively connected to said reference signal means and said servomotor providing a time integral measure of the displacement of the craft from its selected course, normally ineffective means for disabling said time integral signal providing means, and means operable to render said disabling means effective during course changes effected through resetting of said course selecting member and to re-establish said disabling means after a time delay including two relatively movable cooperating parts normally positioned at a null condition, a connection between said course selecting member and one of the parts operable to move said part with resetting of said course selecting member, and motive means operable to move the other of the parts to re-establish the null condition between said parts.

2. The combination claimed in claim 1, including means for preventing operation of said motive means when the rudder angle reaches a predetermined limit.

3. In a steering system for marine craft having a rudder controlling servomotor, a settable course selecting member, reference signal means operatively connected to said servomotor providing a measure of the displacement of the craft from the course set by said course selecting member, signal means operatively connected to said reference signal means and said servomotor providing a time integral measure of the displacement of the craft from its selected course, normally ineffective electrical means for disabling said time integral signal providing means, and means operable to render said disabling means effective during course changes effected through resetting of said course selecting member and to re-establish said disabling means after a time delay including a cam and a cam follower normally positioned at a null condition, a connection between said course selecting member and said cam operable to move the cam with resetting of said course selector member, and circuit means including an electric motor operable to move said cam follower to re-establish the null condition between the same and the cam.

4. The combination claimed in claim 3, in which said circuit means includes switching means for opening the same when the rubber angle reaches predetermined limits to prevent operation of said electric motor.

5. In a steering system for marine craft having a rudder controlling servomotor, a settable course selecting member, reference signal means operatively connected to said servomotor providing a measure of the displacement of the craft from the course set by said course selecting member, signal means operatively connected to said reference signal means and said servomotor providing a time integral measure of the displacement of the craft from its selected course, relay means for rendering said time integral signal providing means ineffective, and time delay means for operating said relay means upon a change in setting of said course selector member having relatively movable parts, one of which is connected to said course selector member, and switching means mounted on the other of said parts having an actuating member operatively connected to the part connected to said course selector member.

6. In a steering system for marine craft having a rudder controlling servomotor, a settable course selecting member, reference signal means operatively connected to said servomotor providing a measure of the displacement of the craft from the course set by said course selecting member, signal means operatively connected to said reference signal means and said servomotor providing a time integral measure of the displacement of the craft from its selected course, circuit means including a disabling switch operable to render said time integral signal providing means ineffective, and a time delay device for operating said disabling switch having relatively movable parts, one of which is connected to said course selector member, and switching means mounted on the other of said parts having an actuating member operatively connected to the part connected to said course selector member.

7. In a steering system for marine craft having a rudder controlling servomotor, a settable course selecting member, reference signal means operatively connected to said servomotor providing a measure of the displacement of the craft from the course set by said course selecting member, signal means operatively connected to said reference signal means and said servomotor providing a time integral measure of the displacement of the craft from its selected course, normally ineffective means for disabling said time integral signal providing means, a first time delay device having a part connected to said course selecting member operable during course changes of the craft through said course selecting member to render said disabling means effective, and a second time delay device rendered effective by said first time delay device upon completion of the operating period thereof operable to restore said disabling means to normal ineffective condition upon completion of the operating period thereof.

8. The combination claimed in claim 7, in which said disabling means is an electrical switch and said second time delay means includes a differential having an output connected to said switch, a timing motor providing one input to said differential, and clutch means operable to hold the other input to said differential.

9. In a steering system for marine craft having a rudder controlling servomotor, a settable course selecting member, signal means operatively connected to said servomotor providing a time integral measure of the displacement of the craft from a selected course, a circuit for shunting the integral measuring signal providing means, a relay for rendering said shunt circuit effective, and a time delay device having a part operatively connected to said settable course selecting member effective to operate said relay.

10. The combination claimed in claim 9, in which said time integral signal providing means includes an electric motor, and said circuit shunts the said electric motor.

11. In a steering system for marine craft having a rudder controlling servomotor, signal means operatively connected to said servomotor providing a time integral measure of the displacement of the craft from a selected course, a time delay device operable during course changes of the craft to render said time integral signal providing means ineffective, means providing a measure of the rudder angle of the craft, and means effective when the measurement of said rudder angle measuring means is at a selected limit for extending the duration of the operation of said time delay device.

12. A steering system of the character claimed in claim 11, including means for limiting the output of said time integral measure signal providing means.

References Cited in the file of this patent

UNITED STATES PATENTS

| | | |
|---|---|---|
| 2,546,555 | Meredith et al. | Mar. 27, 1951 |
| 2,568,719 | Curry | Sept. 25, 1951 |
| 2,626,114 | Alderson | Jan. 20, 1953 |